United States Patent
Parrinello et al.

(10) Patent No.: US 7,510,386 B2
(45) Date of Patent: Mar. 31, 2009

(54) APPARATUS FOR COMPRESSION MOULDING PLASTIC ARTICLES

(75) Inventors: Fiorenzo Parrinello, Medicina (IT); Zeno Zuffa, Borgo Tossignano (IT); Alessandro Balboni, Granarolo Dell'Emilia (IT); Dario Beltrandi, Imola (IT)

(73) Assignee: Sacmi Cooperativa Meccanici Imola Scieta Cooperativa, Imola (Bologna) (IT)

( * ) Notice: Subject to any disclaimer, the term of this patent is extended or adjusted under 35 U.S.C. 154(b) by 413 days.

(21) Appl. No.: 10/587,365

(22) PCT Filed: Jan. 31, 2005

(86) PCT No.: PCT/IB2005/000238

§ 371 (c)(1),
(2), (4) Date: Jul. 27, 2006

(87) PCT Pub. No.: WO2005/075171

PCT Pub. Date: Aug. 18, 2005

(65) Prior Publication Data

US 2007/0187019 A1      Aug. 16, 2007

(30) Foreign Application Priority Data

Mar. 4, 2004   (IT) ................. RE2004A0009

(51) Int. Cl.
B29C 31/06 (2006.01)
(52) U.S. Cl. ............... 425/126.1; 425/261; 425/345; 425/438
(58) Field of Classification Search ........ 425/110, 425/126.1, 261, 809, 344–345, 349, 422, 425/438, 453
See application file for complete search history.

(56) References Cited

U.S. PATENT DOCUMENTS

| | | | |
|---|---|---|---|
| 4,979,282 A | | 12/1990 | Alieri et al. |
| 6,007,315 A | * | 12/1999 | Busacchi ................. 425/110 |
| 7,261,533 B2 | * | 8/2007 | Wrosz et al. ............. 425/110 |
| 7,284,974 B2 | * | 10/2007 | Pucci ..................... 425/126.1 |
| 2003/0198708 A1 | | 10/2003 | Pucci |

FOREIGN PATENT DOCUMENTS

| | | |
|---|---|---|
| EP | 0 645 227 A1 | 3/1995 |
| EP | 1 293 332 A2 | 3/2003 |
| GB | 971921 | 10/1964 |
| WO | WO 03/047834 | 6/2003 |

* cited by examiner

*Primary Examiner*—Yogendra Gupta
*Assistant Examiner*—Thu Khanh T Nguyen
(74) *Attorney, Agent, or Firm*—Browdy and Neimark, P.L.L.C.

(57) ABSTRACT

The plant comprises a plurality of shuttles (10) each carrying at least one die part (110), the shuttles being conveyed in a moulding apparatus (20) which is provided with a plurality of punches and a corresponding plurality of seats (21) for holding the shuttles (10), the seats arranged to receive and release the shuttles (10), the moulding apparatus comprising means for inserting the punches into the die cavities (11, 12) of the shuttle and means for withdrawing the punches to achieve a compression moulding cycle for the article. The shuttles (10) are independent of the moulding apparatus. Each shuttles (10) comprises at least one circuit (15) for at least one conditioning fluid for controlling the temperature of the article located in the die, the moulding apparatus (20) comprising at least one feed system (25) for at least one conditioning fluid to feed the conditioning fluid to the shuttles (10) inserted in the seats (21) of the moulding apparatus (20).

10 Claims, 4 Drawing Sheets

APPARATUS FOR COMPRESSION MOULDING PLASTIC ARTICLES

TECHNICAL FIELD

The present invention relates to the compression moulding of plastic articles, an advantageous application of the invention being to mould preforms (semi-finished pieces), typically intended for the subsequent production (typically by blow moulding) of synthetic resin containers.

The article is moulded by pressure-inserting a punch (mould male part) into a hollow die (female mould part) loaded with a charge of solid, pasty or liquid material, in particular a thermoplastic resin.

If the article is the stated preform for producing containers such as bottles or the like, it usually comprises an upper neck provided with projections and a hollow body lying below the neck.

PRIOR ART

Traditional moulding apparatuses, of both continuous and intermittent type, for compression moulding plastic articles are known, presenting a rotating turntable which carries a plurality of die cavities and an overlying corresponding plurality of punches.

The invention preferably relates to a plant having a moulding apparatus of continuous rotary type.

The apparatus rotates about a vertical axis, with each die, along one revolution, receiving a measured quantity of plastic (charge) heated to a temperature such that the plastic is sufficiently fluid, then undergoing pressing of the charge as a result of mutual approach (until mould closure) of the punch and die, followed after a certain time by mould opening.

The mould is opened not before the temperature of the article formed between the die cavity and the punch has fallen below a predetermined value such that the mould surfaces can be detached from the article without altering its physical-chemical characteristics, with negative consequences for the product.

In the case of thermoset rubbers the temperature must instead be greater than a predetermined value.

A plant is also known (illustrated in U.S. Pat. No. 4,979,282) comprising a plurality of shuttles independent of each other and of the moulding apparatus, and each carrying a die cavity; the moulding apparatus is provided with a plurality of punches and a corresponding plurality of seats for receiving shuttles, and operates by receiving and releasing the shuttles, pressure-inserting a punch into each die of the shuttle, then withdrawing it from the die (in particular by lowering the shuttle-die) to complete a compression moulding cycle for the article.

In greater detail, said known plant comprises a turntable rotating about a central vertical axis and comprising along its periphery the seats for the dies; the apparatus rotates (in particular at constant speed) such that, along one revolution, a shuttle is loaded with a measured quantity of plastic (charge), and enters the turntable where it undergoes pressing of the charge as a result of mutual approach of the punch and die, followed by opening of the mould. Said plant is for moulding articles of relatively small mass, which because of their small mass quickly pass from a relatively high temperature, which they attain during compression, to a lower temperature such as to enable them to be detached from the punch and die surfaces without problems.

Plants of this type cannot however be used to mould plastic articles of relatively large mass and thickness, such as PET (polyethylene terephthalate) plastic preforms currently used commercially to produce by blow-moulding those bottles most frequently used to contain fluids. In this case the mass and thickness of the article are so large that a system must be provided to cool the just compressed preform to reduce its temperature within a very short time to a temperature such as to enable the mould to be opened and the preform to be detached from the punch and die without damaging the characteristics of the plastic.

Consequently, to mould preforms, traditional turntable moulding apparatuses of continuous type are used, in which the dies are not carried by shuttles, but are fixed to the turntable so that the dies can be cooled by circuits through which a cooling liquid is circulated.

However, for these traditional apparatuses another problem arises, related to the loading of the plastic charge into the dies. In this respect, it would be desirable to use a dispensing machine having a plurality of charge dispensing ports which move along a (circular) path portion in common with and in synchronism with the movement of the dies, as this would increase production and also enable charges of greater mass to be loaded. For this purpose a moulding apparatus is known (WO 03/047834) in which the dies are able to undergo slight movement in a direction radial to the turntable, and can hence follow through a certain arc the circular path of the charge dispensing ports.

However the dies are again fixed to the turntable, said arc in common with the dispensing ports therefore being unable to be of a relatively long length. This represents a considerable limit in dispensing charges of sufficiently large mass (for example greater than 12 grams of PET with a thickness greater than 1 mm).

It would in fact be necessary to achieve an arc in common with the dispensing machine which is greater than that obtainable with this type of moulding apparatus.

An object of the present invention is to overcome said drawbacks by means of a plant which allows relatively rapid conditioning (in particular, but not only, cooling) of articles also having a relatively very large mass and thickness, while at the same time enabling the dies to be moved along an arc in common with the dispensing ports of a dispensing machine, of relatively long length, in fact close to 360 degrees.

DISCLOSURE OF THE INVENTION

This and other objects are attained by the invention as characterised in the claims. According to the invention, said object is attained by the plant for compression moulding plastic articles by inserting a punch into a die cavity loaded with a charge, comprising a plurality of shuttles, each of which at least partly carries at least one die cavity, and a moulding apparatus which is provided with a plurality of punches and, for holding individual shuttles, a corresponding plurality of seats arranged to receive and release the shuttles, and which pressure-inserts a punch into each shuttle die to then withdraw it from the die to achieve a compression moulding cycle for the article, said shuttles being independent of the moulding apparatus. The invention is characterised in that said shuttles each comprise at least one circuit for at least one fluid for conditioning the temperature of the article located in the die, the moulding apparatus comprising at least one feed system for at least one conditioning fluid, to feed said conditioning fluid to the shuttles inserted in the seats of the moulding apparatus.

Specifically, said feed system is connected to the shuttle seats and comprises, in each shuttle seat, means enabling the fluid to communicate with the shuttle conditioning circuits, which means become connected to at least one respective port of said conditioning system of a shuttle when inserted into the seat.

In particular, the moulding apparatus comprises means to allow communication between each shuttle and said communication port after inserting the shuttle into the shuttle seat and to interrupt communication during those stages in which the shuttle is withdrawn from the seat.

The plant can comprise, in addition to the moulding turntable, a further plastic handling apparatus, in particular a dispensing machine, for inserting the charges into the shuttle dies, and having a plurality of seats arranged to receive and release the shuttles; this further apparatus can comprise at least one respective conditioning fluid feed system connected to the shuttle seats and having, in each shuttle seat, means which enable the fluid to communicate with the shuttle conditioning circuits and which become connected to at least one respective port of the conditioning circuit of a shuttle when inserted into the seat.

Essentially, shuttle conditioning can be effected in all apparatuses of the machine, including in the transfer turntables.

According to a preferred embodiment of the entire plant, the moulding apparatus comprises, rotating about a central vertical axis, a turntable on the outer periphery of which are positioned said shuttle seats, the plant further comprising:
- a dispensing machine having a rotating head carrying a plurality of dispensing ports, each arranged to dispense a charge;
- a rotary transport means associated with and lying below said dispensing head and rotating in synchronism therewith, to move the shuttles through an arcuate path coinciding with the path of the dispensing heads, the vertical axes of these latter substantially coinciding with the axis of the underlying shuttles;
- a first transfer means to transfer the shuttles from the moulding apparatus to the rotary transport means associated with the dispensing machine;
- a second transfer means to transfer the shuttles from the rotary transport means associated with the dispensing machine to the moulding apparatus.

The fact that the die cavities are carried by independently movable shuttles which are independent of the moulding apparatus enables the dies to be moved through an arcuate path lying outside the moulding turntable, and having a very long length (even close to 360 degrees), which coincides with the path of a plurality of overlying charge dispensing heads, hence providing considerable freedom in forming such dispensing machines and enabling a large number of stations to be used without penalizing the moulding arc.

The dies can also or alternatively be conditioned outside the moulding apparatus, in particular within the dispensing machine, for example to improve mould filling by heating the plastic and possibly also creating a suction action within the die to draw the charge downwards.

The fact that the dies are outside the moulding turntable enables dispensing machines to be formed without dimensional constraints for that machine part overlying the dies; and the fact that the common path between the dies and dispensing ports is relatively long provides considerable scope in designing the dispensing machine, with regard both to its layout and to its functional aspects, with the result that the operative rate during filling can be increased, the filling can be effected more precisely, charges of greater mass can be inserted, etc.

In addition, the fact that the dies are conditioned (in particular cooled, as in the case of transforming thermoplastic material such as PET) by a suitable conditioning system, makes it possible to use the shuttles for moulding articles of large mass and thickness, and in particular thermoplastic resin preforms for producing bottles.

The articles can be of either thermoplastic or thermoset resin; in the first case the conditioning will be by cooling, whereas in the second case it will be by heating.

Finally, the particular plant implementation enables the constructional appearance of the plant to be rationalized to the maximum extent.

BRIEF DESCRIPTION OF THE DRAWINGS

The invention is described in detail hereinafter with the aid of the accompanying figures, which illustrate one embodiment thereof by way of non-limiting example.

BEST MODE FOR CARRYING OUT THE INVENTION

The plant of the invention operates on a plurality of shuttles 10, each carrying at least part of one or more die cavities.

Figure 2:
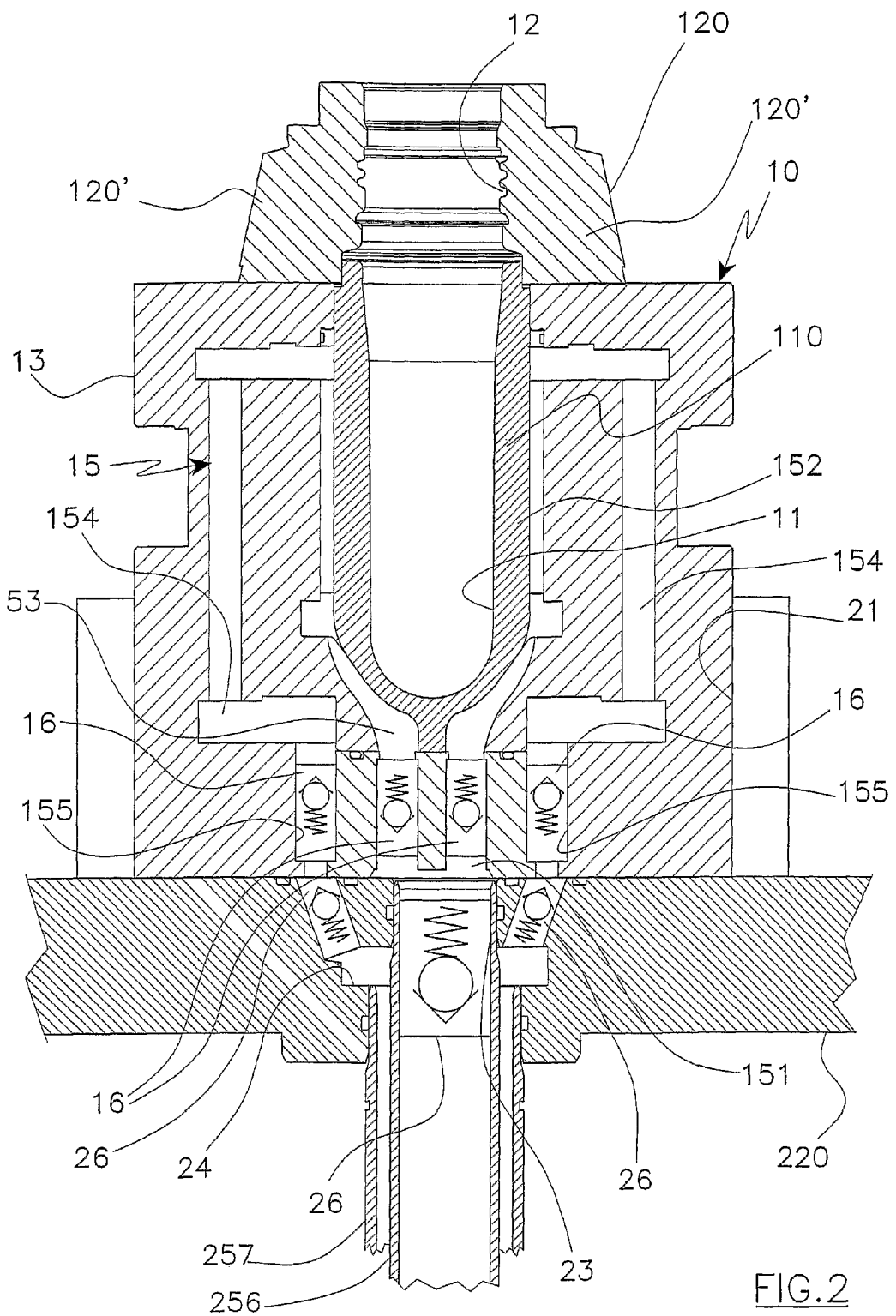
FIG. 2 is a section through the shuttle on a generic radial plane II-II of FIG. 1.

In the embodiment shown in FIG. 2, the shuttle 10 is for moulding preforms which are then used to form (typically by blow moulding) thermoplastic resin bottles (in particular of PET), and comprises a neck, having the final shape required on the bottle, and a hollow body intended, during the bottle formation, to form its containing body. In this case the die is formed from a concave lower part 110 and an upper part 120 with a through cavity. The lower part 110 possesses a smooth concave surface 11 which gives the shape to the outer surface of the preform hollow body, the upper part 120 possessing a concave surface which gives the shape to the outer surface of the neck. As this is provided with radial projections, said upper part 120 is divided into at least two half-parts 120' (two in the illustrated example) to be transversely moved apart to release the preform. The two concave surfaces 11 and 12 form the die cavity.

In the embodiment shown in FIG. 2, the shuttle 10 carries both the die lower part 110 and the upper part 120.

In a different embodiment of the shuttle 10 (not shown in the figures), this carries only the die lower part 110, while the upper part remains on the moulding apparatus.

The plant comprises a moulding apparatus 20 provided with a plurality of seats 21 for holding individual shuttles 10, and a corresponding plurality of punches (not shown in the figures) to be inserted axially into the die cavities 11 and 12. The apparatus 20 is also arranged to receive and release the shuttles 110, to pressure-insert a punch into each shuttle die cavity 11, 12, and to then withdraw it from the die to complete a compression moulding cycle for the article. Punch insertion and its withdrawal from the die can be achieved by moving the die upwards and respectively downwards while the punch remains at rest, or by moving the punch downwards and respectively upwards while the die remains at rest; or, finally, by simultaneously moving both the punch and die.

The shuttles are totally independent of the moulding apparatus 20 in the sense that they can be completely withdrawn from the apparatus and operate with another apparatus.

In the embodiment shown in FIG. 2, the shuttle 10 comprises a generally substantially cylindrical body 13 carrying the lower die part 110 in a central axial position, the two upper half-parts 120' being carried on its upper end.

Figure 1:
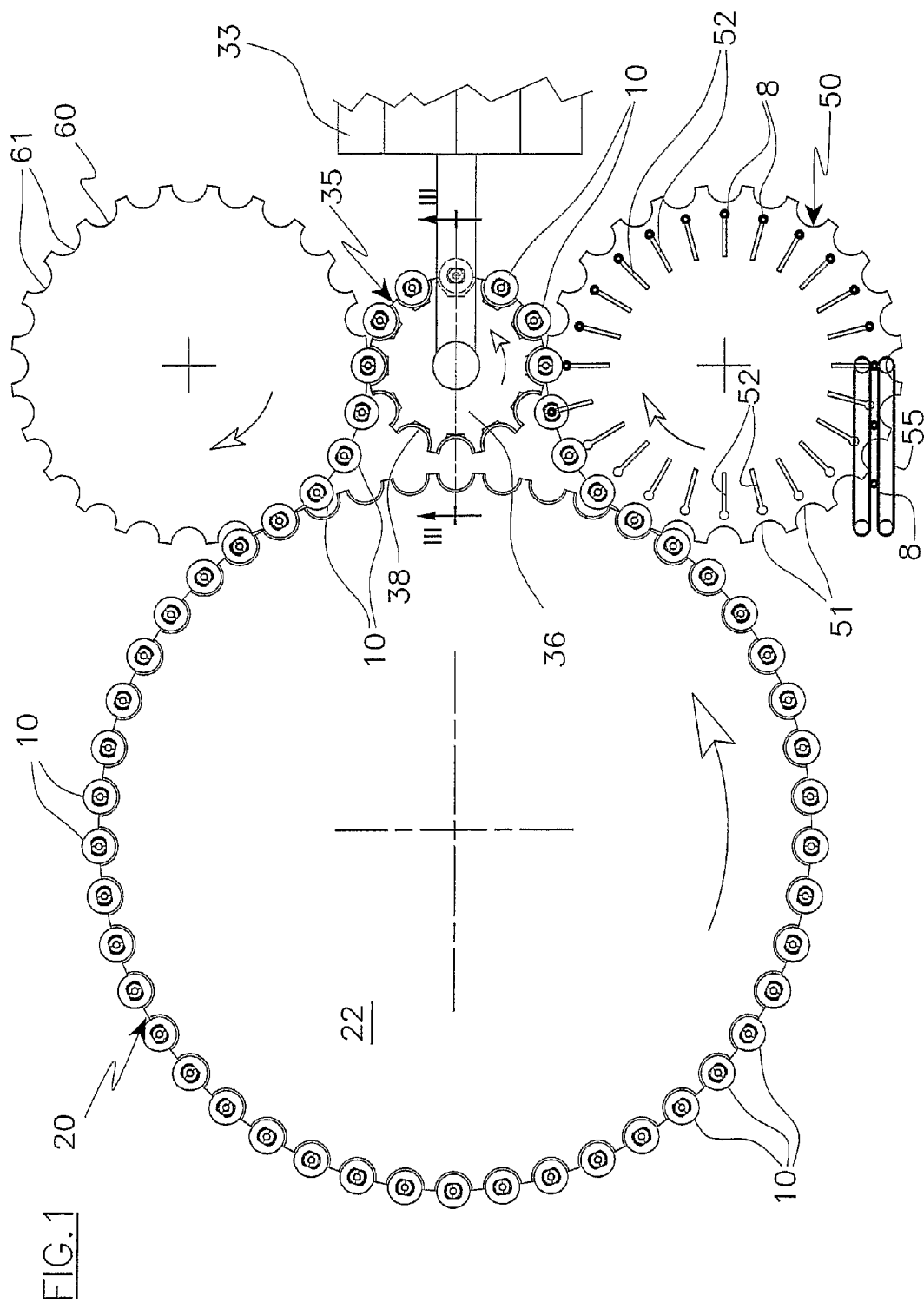
FIG. 1 is a (schematic) plan view of the plant of the invention.
Figure 1A:
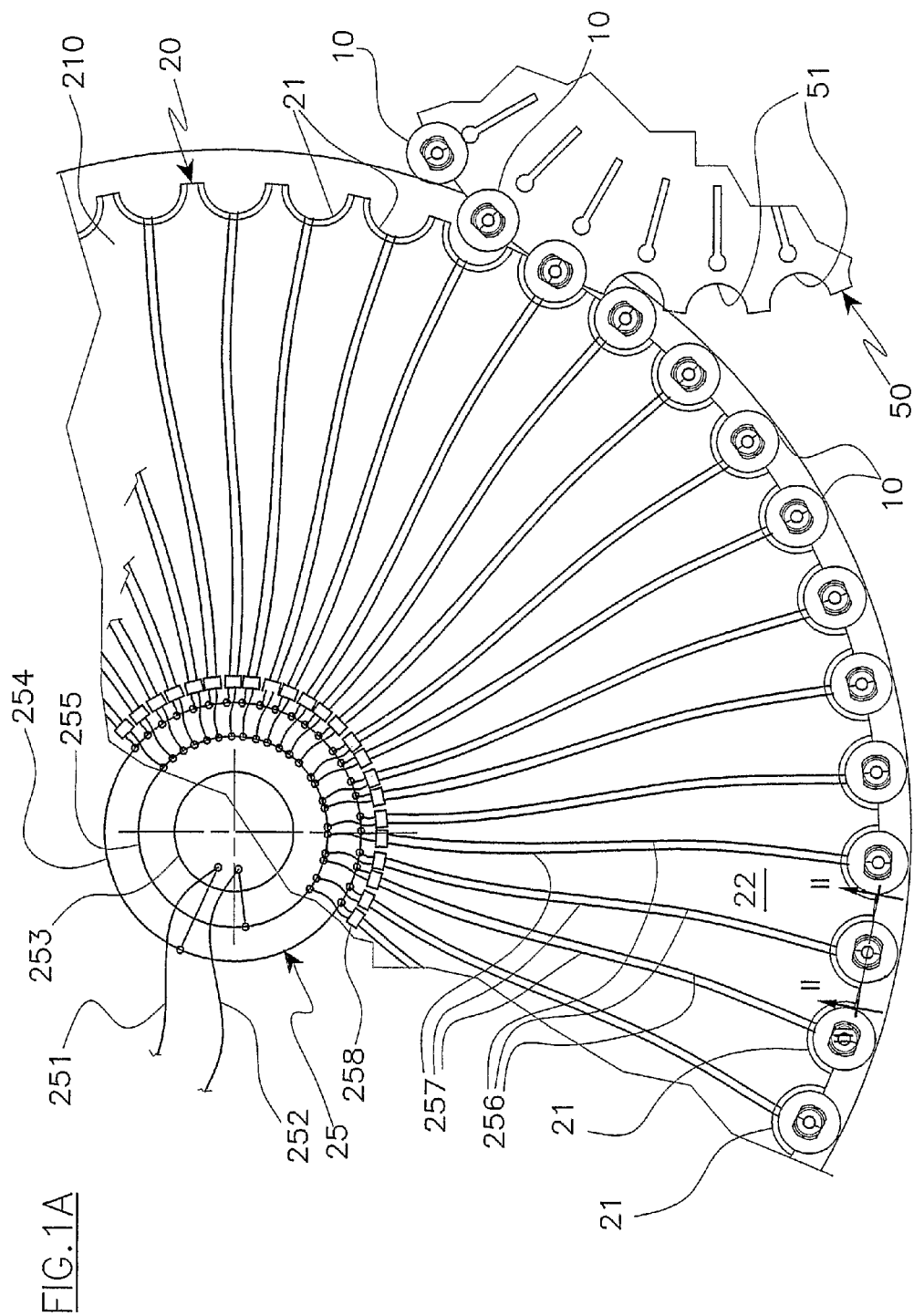
FIG. 1A is an enlarged detail of FIG. 1.

In the embodiment shown in FIG. 1, the moulding apparatus 20 comprises a turntable 22 rotating about a vertical central axis and carrying said shuttle seats 21 on its outer periphery. In the example shown in FIGS. 1 and 2, said seats 21 are in the form of semi-cylindrical housings provided on the periphery of a rotating circular plate 220 and forming part of the turntable, they being open towards the plate perimeter to define a support for the shuttle ends and a lateral support for their lateral surface.

The shuttles 10 are housed as an exact fit within the seats 21 and are inserted into and extracted from them by radial movement. Said seats 21 are then completed by known means, not shown, acting as side walls to retain the shuttles in the seats against centrifugal radial force.

According to the invention, the shuttles 10 each comprise at least one circuit 15 for at least one fluid for conditioning the temperature of the article contained in the die cavity.

In the embodiment shown in FIG. 2, the conditioning circuit 15 comprises a central portion 152 which extends about the lower die part 110, to achieve effective heat transfer with the entire surface 11, and is fed via inlet conduits 153 having an inlet port 151, and connected to outlet conduits 154 which open into a like number of outlet ports 155.

Alternatively, the conditioning circuit 15 can also involve the cavity 12 of the upper die part 120.

The moulding apparatus 20 itself comprises at least one conditioning fluid feed system 25 connected to the shuttle seats 21, each seat 21 comprising at least one fluid feed port 23 which becomes connected to a respective inlet port 151 of said conditioning circuit 15. If the conditioning fluid is a liquid, at least one (specifically two in the figures) discharge port 24 becomes connected to a respective outlet port 155, when the shuttle is inserted into the seat 21.

If the fluid is an aeriform, for example cold air, this could be discharged directly into the external environment, in which case the discharge port 24 would not exist The shuttle ports 151 and 155 and the ports 23 and 24 of the seat 21 accommodate valves 16 and respectively 26 to allow communication between each shuttle 10 and said communication ports after inserting the shuttle 10 into the seat 21 and to interrupt communication when the shuttle 10 is withdrawn from the seat 21. For example, said valves 16 and 26 can be of unidirectional type, able to allow fluid to pass only when the fluid feed pressure exceeds a determined minimum value. The purpose of the valves 16 is mainly to prevent emptying of the conditioning fluid from the shuttle when this is disconnected; alternatively, automatic emptying systems can be provided.

FIG. 1 shows schematically one embodiment of the conditioning fluid feed system 25; this comprises a fixed fluid delivery conduit 251 connected to a fixed source of pressurized conditioning fluid located outside the turntable 22 and a fixed discharge conduit 252 connected to an external discharge, these being connected by a rotary distributor 253 to a delivery manifold 254 and a discharge manifold 255 respectively, both rotating rigid with the turntable 22. Said manifolds 254 and 255 are themselves connected by a respective delivery conduit 256 and discharge conduit 257, rigid with the turntable 22, to said ports 23 and 24 respectively. Each pair of conduits 256 and 257 is connected to a distributor valve 258 arranged to control the feed and discharge of the fluid through the conduits. Each valve 258 is controlled for example electrically with automatic centralized control, such that the flow of conditioning fluid is managed on the basis of the angular position of the relative seat 21.

Two (or more) different fluids can be circulated in succession through the same conditioning circuit 15, for example firstly a heating fluid to heat the die during the stage preceding compression, followed by a cooling fluid to cool the just moulded preform. In this case two manifolds are provided, connected via the valve 258 to the same two conduits 256 and 257.

More than one conditioning circuit 15 can be provided within the shuttle to more or less simultaneously circulate a like number of conditioning fluids, for example to obtain die regions of different temperatures.

The connection between the shuttle 10 and the system 25 is preferably made at the lower end of the shuttle; it is however possible to make this connection in other parts, for example in the top part of the shuttle, distant from the plate 220.

The term "conditioning fluid" means a fluid which can cool or heat the die. For example, if using non-thermoplastic resins it could be useful to heat the die to cross-link the resin. Alternatively, in the case of thermoplastic resin, certain regions of the die could be heated to improve mould filling.

According to other alternative embodiments, not shown in the figures, for each shuttle 10, in addition to said conditioning circuit 15, at least a second circuit could be provided for an operative fluid able to move parts of the shuttle (for example to move the two half-die portions 120') and/or for another fluid having functions other than die conditioning, and/or for forced air suction from the die during compression. In this case the moulding apparatus 20 would comprise at least a second system for feeding said operative fluid, and/or another fluid, and/or for forced air suction, connected to the shuttle seats 21, having in each shuttle seat at least one port provided for connecting said fluid to the shuttles and/or for drawing the fluid from the shuttles, and becoming connected to a respective port of said second circuit of a shuttle when inserted into said seat.

Figure 3:
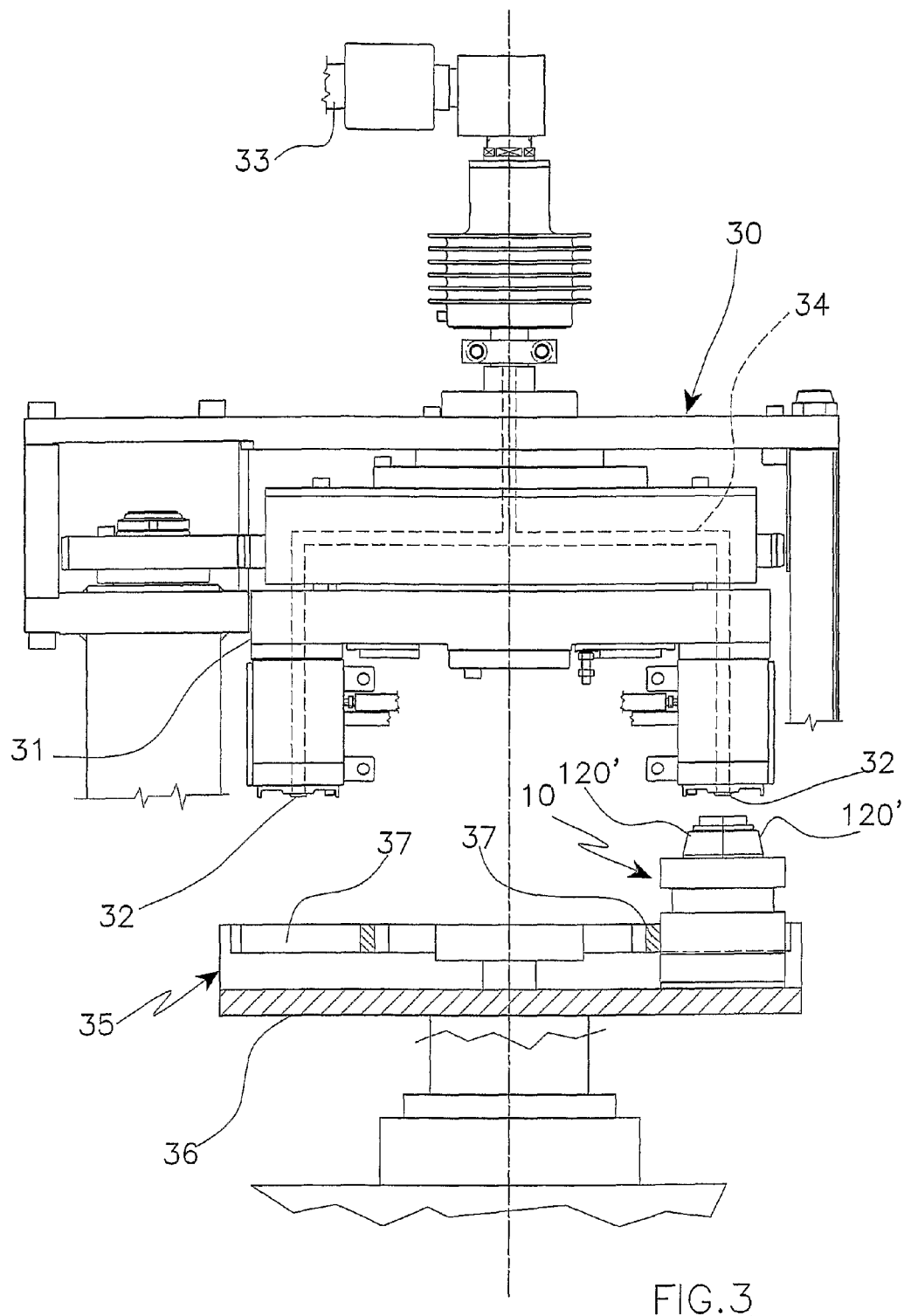
FIG. 3 is a section on the plane III-III of FIG. 1.

In a preferred (but non-exclusive) embodiment, in addition to the described moulding apparatus 20, the plant comprises, for inserting charges into the dies of the shuttles 10, a dispensing apparatus 30 (shown in FIG. 3) having a rotary head 31 which is fed by a fluid plastic feed source and which itself, via a channel 34, feeds a plurality of dispensing ports 32 carried by the head and each able to dispense a sized charge.

This apparatus 30 is not shown in FIG. 1 (which shows only the fluid plastic source 33), to leave visible an underlying rotary transport means 35. This rotates in synchronism with the overlying dispensing head 31 and is arranged to move the shuttles 10 through an arcuate path which coincides with the path of the dispensing ports 32 and such that the vertical axis of these coincides substantially with the axis of the underlying die cavities 11, 12. Specifically, it comprises a rotary plate 36 which supports the shuttles 10, a plurality of seats 38 able to receive and release the shuttles 10, and a plurality of means 37 for retaining the shuttles in their correct angular position.

According to a preferred (but non-exclusive) embodiment, between the moulding turntable 20 and the dispensing apparatus 30 there is operatively interposed a first transfer means, for example a first transfer turntable 50, provided with seats 51 to receive and release the shuttles, and arranged to transfer the shuttles 10 of the moulding apparatus 20 to the rotary transport means 35 associated with the dispensing machine 30.

This first turntable 50 can possess means able to grasp the preforms (indicated by 8 in FIG. 1 and represented as small dark circular rings) and to separate them from the shuttles 10 where they were formed; for this purpose it comprises a plurality of means 52, one for each shuttle seat 51, which rotate rigid with these and possibly also movable radially, to grasp the preforms, separate them from the shuttles 10 and release them to a means 55 for evacuating the preforms 8.

Finally, according to a preferred (not non-exclusive) embodiment, a second transfer means is provided, for example a second transfer turntable 60 provided with seats 61 for receiving and releasing the shuttles 10, and arranged to transfer the shuttles 10 from the rotary transport means 35 pertaining to the dispensing machine 30, to the moulding apparatus 20.

A further conditioning fluid feed system (not shown in the figures) can be provided, having basically the aforestated characteristics of said feed system 25 associated with the moulding apparatus 20; this further feed system is applied in one or more of the other apparatuses, i.e. the dispensing apparatus 30, the transfer turntable 50, the transfer turntable 60, and/or further apparatuses, not shown in the figures.

If said feed system is provided in the dispensing apparatus 30, it is arranged to be connected to and disconnected from the conditioning circuits 15 of the shuttles 10 when inserted into the seats 38. In the same manner as the described first system 25, this second fluid feed system is connected to the seats 38 of the means 35 and has, in each seat 38, means enabling the fluids to communicate with the conditioning circuits 15 which become connected to at least one respective port of said circuit 15 of a shuttle 10 when inserted into the seat 38.

This serves, for example, to circulate a heating fluid through the shuttle while this is positioned on the rotary means 35 while inserting the charge, so as to improve filling of the die; then when the shuttle is inserted into the moulding apparatus 20, a die cooling fluid is circulated through the shuttle via the same circuit.

A similar feed system can be also or alternatively provided on the transfer turntable 50 and/or on the second transfer turntable 60, to be connected to and disconnected from the conditioning circuits 15 of the shuttles 10 inserted into the relative seats provided on this apparatus.

A fluid for purposes other than die conditioning can be circulated through the same shuttle circuit 15 when the shuttles are inserted into apparatuses other than the apparatus 20; for example for forced drawing of air from the die or for other functions, or to move parts of the shuttle 10.

The shuttles can also have at least one other circuit for fluids having different functions (for example for forced drawing of air from the die or for other functions); for example, to create a vacuum within the die in order to correctly transfer the charge downwards into the die cavity, or to move parts of the shuttle 10. Corresponding feed systems would be provided to feed these other circuits.

FIG. 1 shows a layout with a minimum number (two) of transfer turntables; the plant could however have a greater number of turntables, each with the characteristic that the shuttles can be fed by conditioning fluids operative for other purposes.

As will be apparent, during the stage in which they are being loaded with a charge, the dies on the shuttles 10 lie outside the turntable, consequently the size of the head 31 which dispenses the charge is not limited by the fact of having to be inserted into the space between a punch and a die.

Moreover the dies are able to rigidly follow the path of the dispensing ports 32 through a relatively long arc (about 180 degrees in the example shown in FIG. 1, but which can be much longer), with the great advantage of extending the possible constructional forms of the dispensing machine with regard to both design aspects and functional aspects, with the result for example of being able to increase the operative rate during filling, achieve more precise filling, and insert charges of greater mass.

At the same time, the conditioning circuit 15 provided for each shuttle allows effective conditioning, in particular cooling, of the die and hence of the article formed while the shuttle lies on the moulding apparatus 20, with the advantageous result that the die behaves, with regard to its conditioning, as a die of fixed type carried by an apparatus of traditional type and conditioned by traditional fluid systems. When however the shuttle 10 is detached from the apparatus 20, its circuit 15 closes and becomes inactive, the shuttle then being able to be manipulated as a shuttle of known type.

Numerous modifications of a practical and applicational nature can be made to the invention, but without leaving the scope of the inventive idea as claimed below.

The invention claimed is:

1. A plant for compression moulding plastic articles by pressure-inserting a moulding punch into a cavity (11, 12) of a die (110, 120) loaded with a charge, comprising:
  a plurality of shuttles (10) each carrying at least one die part (110), a moulding apparatus (20) which is provided with a plurality of punches and, for holding shuttles (10), a corresponding plurality of seats (21) arranged to receive and release the shuttles (10), and which pressure-inserts a punch into the die cavities (11, 12) of the shuttle (10) and withdraws it to achieve a compression moulding cycle for the article, said shuttles (10) being independent of the moulding apparatus,
  characterised in that
  said shuttles (10) each comprise at least one circuit (15) for at least one fluid for conditioning the temperature of the article located in the die, the moulding apparatus (20) comprising, for at least one conditioning fluid, at least one feed system (25) to feed the conditioning fluid to the shuttles (10) inserted in the seats (21) of the moulding apparatus (20).

2. A plant as claimed in claim 1, characterised in that said feed system (25) is connected to the shuttle seats (21) and comprises, in each shuttle seat (21), means (23) enabling the fluid to communicate with the shuttle conditioning circuits (15), which means become connected to at least one respective port (151) of said conditioning circuit (15) of a shuttle (10) when inserted into the seat (21).

3. A plant as claimed in claim 1, comprising, in addition to said moulding apparatus (20), at least one other apparatus (35, 50, 60) for treating plastic relative to the die parts (110) positioned on the shuttles (10) and having, for receiving and releasing the shuttles (10), a corresponding plurality of seats (38, 51, 61) able to hold individual shuttles (10), said shuttles (10) being independent of the plastic treatment apparatus (35, 50, 60),
  characterised in that:
  said plastic treatment apparatus (35, 50, 60) comprises at least one further feed system for at least one conditioning fluid, which is connected to the shuttle seats (38, 51, 61) and comprises, in each shuttle seat (38, 51, 61), means enabling the fluid to communicate with the shuttle conditioning circuits (15) and becoming connected to at least one respective port (151) of said conditioning system (15) of a shuttle (10) when inserted into the seat (38, 51, 61).

4. A plant as claimed in claim 1, characterised by comprising means to allow communication between each shuttle (10) and said at least one communication port (23) after inserting the shuttle (10) into the shuttle seat (21, 38, 51, 61) and to interrupt communication during those stages in which the shuttle is withdrawn from the seat.

5. A plant as claimed in claim 3, characterised by comprising means to allow communication between each shuttle (10)

and said at least one communication port (23) after inserting the shuttle (10) into the shuttle seat (21, 38, 51, 61) and to interrupt communication during those stages in which the shuttle is withdrawn from the seat.

6. A plant as claimed in claim 1, characterised in that each shuttle (10) comprises at least a second circuit for an operative fluid able to move parts of the shuttle (10) and/or for another fluid having functions other than conditioning of the die (110, 120), and/or for forced air suction from the die (110, 120) or for other functions, said apparatus (20, 35, 50, 60) comprising at least one respective appropriate system for feeding said operative fluid, and/or another fluid, and/or for forced air suction, connected to the shuttle seats (21, 38, 51, 61), to feed said fluid to the shuttles (10) when inserted into the seats (21, 38, 51, 61) of the apparatus (20, 35, 50, 60).

7. A plant as claimed in claim 3, characterised in that each shuttle (10) comprises at least a second circuit for an operative fluid able to move parts of the shuttle (10) and/or for another fluid having functions other than conditioning of the die (110, 120), and/or for forced air suction from the die (110, 120) or for other functions, said apparatus (20, 35, 50, 60) comprising at least one respective appropriate system for feeding said operative fluid, and/or another fluid, and/or for forced air suction, connected to the shuttle seats (21, 38, 51, 61), to feed said fluid to the shuttles (10) when inserted into the seats (21, 38, 51, 61) of the apparatus (20, 35, 50, 60).

8. A plant as claimed in claim 1, characterised in that:

said moulding apparatus (20) comprises, rotating about a central vertical axis, a turntable (22), on the outer periphery of which are positioned said shuttle seats (21), the plant further comprising:

a dispensing apparatus (30) having a rotating head (31) carrying a plurality of dispensing ports (32), each arranged to dispense a charge;

a rotary transport means (35) associated with and lying below said dispensing head (31) and rotating in synchronism therewith, to move the shuttles (10) through an arcuate path coinciding with the path of the dispensing ports (32), such that the vertical axes of these latter substantially coincide with the axis of the underlying dies (110, 120);

first transfer means (50) to transfer the shuttles (10) from the moulding apparatus (20) to the rotary transport means (35) associated with the dispensing machine (30);

second transfer means (60) to transfer the shuttles (10) from the rotary transport means (35) associated with the dispensing machine to the moulding apparatus (20).

9. A plant as claimed in claim 8, characterised in that said first and/or second transfer means (50, 60) comprise respective transfer turntables provided with seats (51, 61) able to receive and release the shuttles (10).

10. A plant as claimed in claim 8, characterised in that said first transfer turntable (50) comprises a plurality of means (52) arranged to grasp the performs, to separate them from the shuttles (10), and to release them to a perform evacuation means (55).

* * * * *